United States Patent [19]
Takahashi et al.

[11] Patent Number: 5,641,344
[45] Date of Patent: Jun. 24, 1997

[54] FUEL VAPOR TREATMENT DEVICE

[75] Inventors: Masafumi Takahashi, Kiyose; Yuji Chino, Yoshimi; Hiroyuki Yoshida, Kawagoe, all of Japan

[73] Assignee: Tsuchiya Mfg., Co., Ltd., Tokyo, Japan

[21] Appl. No.: 566,717

[22] Filed: Dec. 4, 1995

[30] Foreign Application Priority Data

Dec. 5, 1994 [JP] Japan .................... 6-329261
Sep. 21, 1995 [JP] Japan .................... 7-266136

[51] Int. Cl.$^6$ .................................. B01D 53/04
[52] U.S. Cl. .................. 96/139; 96/141; 96/147; 96/149; 96/152; 123/519
[58] Field of Search .................... 96/108, 134–144, 96/147, 149, 152, 153; 123/519–521

[56] References Cited

U.S. PATENT DOCUMENTS

| | | |
|---|---|---|
| 3,683,597 | 8/1972 | Beveridge et al. .......... 96/139 X |
| 4,058,380 | 11/1977 | King, II ...................... 96/144 |
| 4,193,383 | 3/1980 | Rogers ........................ 96/139 X |
| 4,318,383 | 3/1982 | Iritani et al. ................ 96/144 X |
| 4,338,106 | 7/1982 | Mizuno et al. .............. 96/137 X |
| 4,403,587 | 9/1983 | Mizuno et al. .............. 96/137 X |
| 4,448,594 | 5/1984 | Kozawa ....................... 96/137 X |
| 4,454,849 | 6/1984 | Mizuno et al. .............. 96/137 X |
| 4,507,132 | 3/1985 | Yoshida ...................... 96/139 |
| 4,655,189 | 4/1987 | Koga ........................... 96/136 |
| 4,658,796 | 4/1987 | Yoshida et al. ............. 96/144 X |
| 4,683,862 | 8/1987 | Fornuto et al. ............. 96/134 X |
| 4,684,382 | 8/1987 | Abu-Isa ...................... 96/134 |
| 4,714,485 | 12/1987 | Covert et al. ............... 96/143 |
| 4,750,465 | 6/1988 | Rediker, Jr. et al. ........ 96/144 X |
| 4,853,009 | 8/1989 | Turner et al. ............... 96/144 |
| 4,951,643 | 8/1990 | Sato et al. ................... 123/519 X |
| 5,119,791 | 6/1992 | Gifford et al. .............. 96/144 X |
| 5,269,837 | 12/1993 | Ohashi et al. ............... 96/136 X |
| 5,304,235 | 4/1994 | Watanabe et al. ........... 96/134 X |
| 5,501,723 | 3/1996 | Andress et al. .............. 96/137 X |

FOREIGN PATENT DOCUMENTS

| | | | |
|---|---|---|---|
| 53-027721 | 3/1978 | Japan | .......... 123/520 |
| 59-165854 | 9/1984 | Japan | .......... 123/159 |
| 62-165568 | 7/1987 | Japan | .......... 96/144 |
| 5-228329 | 9/1993 | Japan | .......... 96/143 |
| 5-278480 | 10/1993 | Japan | . |

*Primary Examiner*—Robert Spitzer
*Attorney, Agent, or Firm*—Foley & Lardner

[57] ABSTRACT

A fuel vapor treatment device or canister for a vehicle evaporative emission control system has a casing filled with a fuel vapor absorbent material in its chamber. A relay pipe projects outwardly from one end the casing and communicates with the chamber. A liquid-fuel separator having a cavity is sealingly mounted to the one end of the casing so that the relay pipe extends into the cavity. Inlet and outlet pipes, which communicate with the cavity and fuel vapor, are formed in the separator. A fuel vapor outflow passage is formed inside the separator and communicates with the outlet pipe. The suction pipe has a reduced size section with an orifice. A liquid-fuel suction pipe, which communicates with the outflow passage through the orifice, extends perpendicularly downwardly from the outflow passage. The suction pipe extends from the orifice to the area where the liquid-fuel collects.

16 Claims, 7 Drawing Sheets

FUEL VAPOR TREATMENT DEVICE

BACKGROUND OF THE INVENTION

1. Field of the Invention

This invention relates to improvements in a fuel vapor treatment device in an evaporative emission control system for preventing the escape of fuel vapors from a fuel tank of an automotive engine, and more particularly to a device, forming part of the fuel vapor treatment device, for preventing liquefied fuel from flowing to a fuel vapor absorbent.

2. Description of the Prior Art

Typically two types of fuel vapor treatment devices (canisters) have been known in the field of automotive engines (mainly of a gasoline-fueled type) to treat fuel vapor generated in a fuel tank of the engine. One of them is schematically shown in FIG. 13 and includes a fuel vapor treatment device or canister C' containing a fuel vapor absorbent M', such as activated carbon. A ventilation line L1 is provided to connect a fuel tank Ta and the canister C'. A check valve V1 is disposed in the ventilation line L1. A purge line L2 is provided to connect the canister C' and an intake air passageway K leading to the combustion chambers of the engine. A control valve V2 is disposed in the purge line L2 to control the amount of fuel vapor sucked into the intake air passageway K.

During stoppage or cruising of the vehicle, fuel vapor generated in the fuel tank T is introduced through the ventilation line L1 to the inside of the canister C' so that the fuel vapor is absorbed in the fuel vapor absorbent M'. When the vehicle cruises, air is sucked into the canister C' through a bottom opening Ca under an air sucking action of the intake air passageway K thereby purging fuel vapor absorbed in the fuel vapor absorbent M'. The purged fuel vapor flows through the control valve V2 into the intake air passageway L2. The amount of the fuel vapor to be fed to the intake air passageway L2 is regulated by the control valve V2 whose opening degree is controlled in accordance with an engine operating condition.

Another is shown in FIG. 14, in which the fuel vapor treatment device or canister C' includes a casing main body C1, with which an upper end wall C2 is integral. A fuel vapor absorbent M", such as activated carbon, is encased in the casing main body C". The upper end wall C2 is provided with an air intake pipe Ca' through which air is introduced into the casing main body C1. A liquid collecting cover W is fixedly mounted on the upper end wall C2. The upper wall of the liquid collecting cover W is provided with an inlet pipe W1 connected through a check valve to a fuel tank, and an outlet pipe W2 connected through a check valve to an intake air passageway leading to the combustion chambers of the engine. The inlet pipe W1 is located adjacent the center axis of the casing main body C" relative to the outlet pipe W2. The liquid collecting cover W is provided at its inner wall surface with a partition wall W3 extending downwardly and having a lower end positioned adjacent the upper end wall C2, and an inner cylinder W4 through which the outlet pipe W2 is in communication with a through-hole C3 formed in the upper end wall C2. Additionally, a relay pipe W5 is provided piercing the upper end wall C2 and located outside of the inner cylinder W4 and has an upper end opened to the inside space of the liquid collecting cover W.

With this arrangement, fuel vapor generated during stoppage or cruising of the vehicle is first introduced through the inlet pipe W1 into the inside space of the liquid collecting cover W and passes through a clearance between the lower end of the partition wall W3 and the upper surface of the upper end wall C2, in which high boiling point components contained in fuel vapor is separated and collected at the lower part of the liquid collecting cover W. Accordingly, only fuel vapor in gas state passes through the relay pipe W5 and introduced into the casing main body C1 to be absorbed in the fuel vapor absorbent M". In a cruising condition of the vehicle, ambient air is sucked through the air intake pipe Ca' under the suction of the intake air passageway, thereby purging fuel vapor absorbed in the fuel vapor absorbent M". The purged fuel vapor is introduced through the through-hole C3 and the outlet pipe W2 into the intake air passageway. The arrangement of FIG. 14 is disclosed in Japanese Patent Provisional Publication No. 5-278480.

However, drawbacks have been encountered in the above-discussed two types of fuel vapor treatment devices, as set forth below. The former fuel vapor treatment device of FIG. 13 is arranged such that the whole fuel vapor generated in the fuel tank is absorbed in the fuel vapor absorbent. Accordingly, the amount of fuel vapor to be absorbed in the fuel vapor absorbent is large so that the fuel vapor absorbent tends to be readily saturated with the fuel vapor, thereby providing the fear of fuel vapor releasing out of the fuel vapor treatment device through the air intake pipe Ca. Additionally, liquefied fuel (high boiling point components contained in the fuel vapor) is also absorbed in the fuel vapor absorbent M' thereby promoting the deterioration of the fuel vapor absorbent M'.

The latter fuel vapor treatment device of FIG. 14 is used in a state to vertically extend as shown in FIG. 14 so that the liquefied fuel accumulated in the liquid collecting cover W cannot be taken out of the device, although the drawbacks encountered in the former fuel vapor treatment device are hardly arisen in this fuel vapor treatment device. In order to make possible it to take out the liquefied fuel or return the liquefied fuel to the fuel tank, it is necessary to horizontally locate the canister C" itself in a manner that the inlet pipe W1 is positioned below the outlet pipe W2, and additionally the canister C" itself is disposed at a position higher than the fuel tank. Thus, there exists a considerable restriction in a setting position of the outlet pipe and an installation state of the canister itself.

SUMMARY OF THE INVENTION

It is an object of the present invention to provide an improved fuel vapor treatment device that can effectively overcome drawbacks encountered in conventional fuel vapor treatment devices used in automotive vehicles.

Another object of the present invention is to provide an improved fuel vapor treatment device that makes it possible to smoothly and securely take liquefied fuel (in the device) out of the device, regardless of the installation state of the device and the location of inlet and outlet pipes (for fuel vapor) of the device.

A further object of the present invention is to provide an improved fuel vapor treatment device including a liquid fuel separator for separating liquefied fuel in fuel vapor, in which separated liquefied fuel accumulated in the separator can be effectively carried toward an intake air passageway leading to the combustion chambers of an engine, regardless of the locational relationship between inlet and outlet pipes (for fuel vapor) of the device and regardless of whether the device is located vertically or horizontally.

A fuel vapor treatment device of the present invention comprises a casing including an end wall defining a chamber filled with fuel vapor absorbent. A relay pipe projects outwardly from the end wall and is in communication with the chamber. A liquid fuel separator is mounted on the casing and includes a cover section sealingly fixed to the end wall of the casing and having an end wall defining thereinside an inside space in which the relay pipe of the casing projects. A fuel vapor inlet pipe is connected to the cover section to be in communication with the inside space of the cover section. A fuel vapor outlet pipe is connected to the cover section to be in communication with the inside space of the cover section. A fuel vapor outflow passage is formed adjacent the end wall of the cover section. The fuel vapor outflow passage has a first end in communication with the inside space, and a second end in communication with the outlet pipe. A liquid fuel suction pipe is disposed in the inside space of the cover section and has a first end at a bottom part of said inside space of said cover section, and a second end located adjacent the fuel vapor outflow passage. The suction pipe has a head portion located at the second end thereof, the head portion being formed with an orifice through which the suction pipe is in communication with the fuel vapor outflow passage. Additionally, a flow restricting area of the fuel vapor outflow passage is formed over the head portion of the suction pipe. The flow restricting area is smaller in cross-sectional area than portions of the fuel vapor outflow passage upstream and downstream of the flow restricting area.

Thus, the fuel vapor treatment device or canister of the present invention is provided with the above arranged liquid fuel separator, and therefore fuel vapor can be suitably treated while provisionally separating and discharging the liquefied fuel in the separator. More specifically, the liquefied fuel accumulated in the separator can be taken out of the canister toward the intake air passageway of the engine under the action of the flow speed of the fuel vapor purged from the fuel vapor absorbent, regardless of the set or installed state of the canister itself and the locational relationship between the inlet and outlet pipes for the fuel vapor, more specifically regardless of the height-locational relationship of the casing relative to the fuel tank and the locational relationship between the inlet and outlet pipes in a vertical direction. This makes it possible to readily set the canister anywhere on an automotive vehicle, while preventing the fuel vapor absorbent from being deteriorated.

BRIEF DESCRIPTION OF THE DRAWINGS

In the drawings, like reference numerals designate like elements and parts throughout all figures, in which.

DETAILED DESCRIPTION OF THE INVENTION

Figure 1:
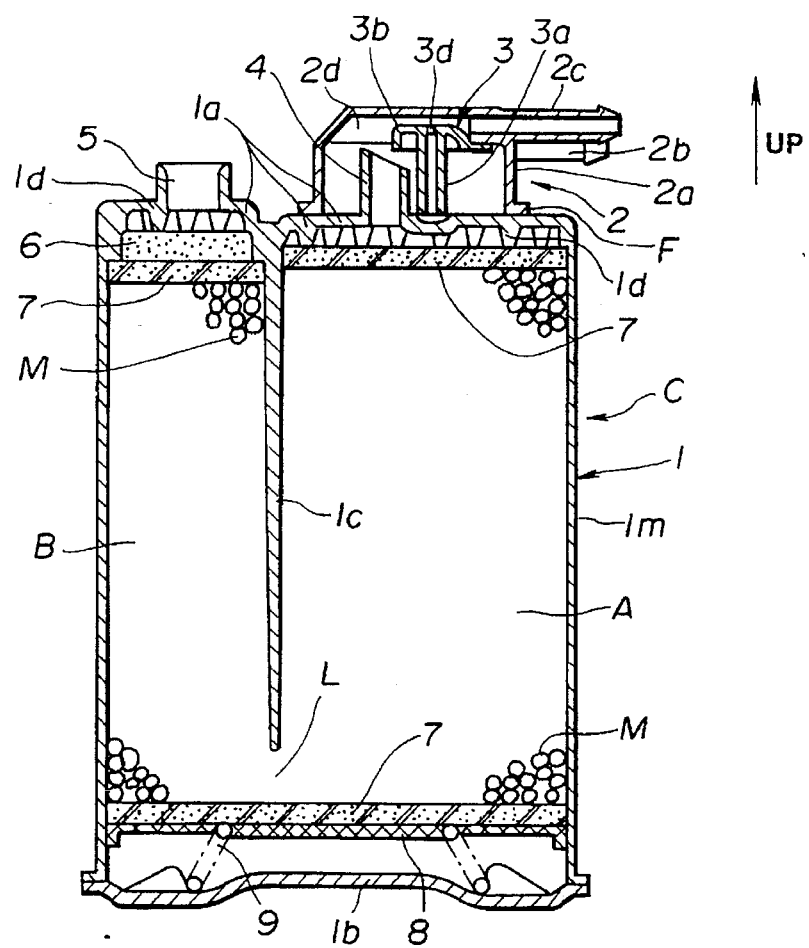
FIG. 1 is a vertical sectional view of an embodiment of a fuel vapor treatment device according to the present invention.
Figure 2:
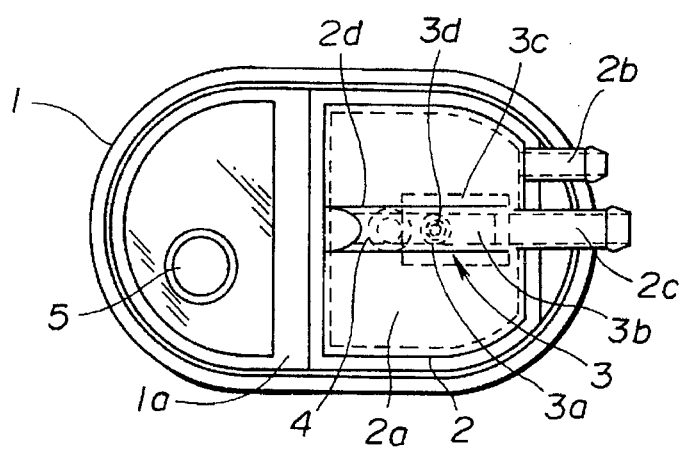
FIG. 2 is a top plan view of the fuel vapor treatment device of FIG. 1.

Referring now to FIGS. 1 to 4 of the drawings, an embodiment of a fuel vapor treatment device or vapor storage canister according to the present invention is illustrated by the reference character C. The canister C of this embodiment is for an automotive vehicle and contains a fuel vapor absorbent M. The canister C forms part of an evaporative emission control system that prevents the escape of gasoline vapors from a fuel tank and a carburetor of an internal combustion engine though not shown, whether or not the engine is running. More specifically, evaporative vapors given off by gasoline (in the fuel tank and in the carburetor when the engine is running) are piped to the canister C where they are absorbed. When the engine is restarted, fresh air is drawn through the canister C. The fresh air is drawn through the fuel vapor absorbent M. The fresh air removes the fuel vapor from the fuel vapor absorbent M and carries the vapor into the engine to be burnt in the combustion chamber of the engine (not shown).

The canister C comprises a casing 1 formed of a plastic or synthetic resin such as nylon or polypropylene. The casing 1 includes a main body section 1$m$, which is generally cylindrical and has a generally oval cross-section. In this case, the canister C is located such that the main body section 1$m$ extends generally vertically so that the axis of the main body section 1$m$ vertically extends. The upper end of the main body section 1$m$ is closed with an upper end wall 1$a$, which is integral with and has the same material as the main body section 1$m$. A partition wall 1$c$ is integral with the upper end wall 1$a$ and extends downwardly to generally divide the inside of the main body section 1$m$ into a large chamber A and a small chamber B, which communicates with each other at their bottom portions. The upper end wall 1$a$ is formed slightly higher at a portion over the small chamber B than a portion over the large chamber A. The portion over the small chamber B is provided at its inner surface with a plurality of spacer projections 1$d$ and further provided with an air intake pipe 5 having an inside opening through which the inside of the main body section 1$m$ is communicates with ambient air. A filter material 6 and a plate-shaped cushioning material 7 are disposed beneath the spacer projections 1$d$ in a manner that they are in contact with each other. The cushioning material 7 is formed of non-woven fabric or polyurethane foam. The edge of the filter material 6 and the cushioning material 7 is in sealing contact with the inner wall surface of the casing main body section 1$m$ and the side wall surface of the partition wall 1$c$. The portion of the upper end wall 1$a$ is also provided at its inner surface with a plurality of spacer projections 1$d$, further provided with an upwardly extending relay pipe 4 having an inside opening in communication with the large chamber A. A cushioning material 7 is disposed beneath the spacer projections 1d. The edge of the cushioning material 7 is in sealing contact with the inner wall surface of the casing main body section 1m and the side wall surface of the partition wall 1c.

The fuel vapor absorbent M, such as activated carbon or charcoal is filled in both the large and small chambers A, B. A plate-shaped cushioning material 7 and a supporting member 8 are disposed beneath the fuel vapor absorbent M in a manner that they are in contact with each other. The cushioning material 7 is located separate from the lower end of the partition wall 1c thereby defining a lower opening L through which the large and small chambers A, B communicate with each other. The supporting member 8 is netting-like or lattice-like and made of a metal or a plastic. A spring 9 is disposed between the supporting member 8 and a lower end wall 1b, which is welded to the lower end of the casing main body section 1m so as to push up or bias the supporting member 8 upwardly under a predetermined pressure. Accordingly, the fuel vapor absorbent M is tightly packed between the upper-side cushioning materials 7, 7 adjacent the upper end wall 1a and the lower-side cushioning material 7 in contact with the support member 8.

A liquid fuel separator 2 is provided on the upper end wall 1a of the casing 1. More specifically, the liquid fuel separator 2 includes a separator cover 2a made of the same material as that of the casing main body section 1m. The separator cover 2a is provided at its bottom portion with a laterally outwardly extending flange F, which generally circularly extends to be endless thereby defining thereinside a bottom opening (no numeral). The flange F of the separator cover 2a is welded to the upper surface of the upper end wall 1a of the casing 1 in a manner to maintain a gas tight seal between the separator cover 2a and the casing upper end wall 1a. The separator cover 2a has a predetermined height and is formed with an inside space having a predetermined volume. Under this state, the relay pipe 4 is located near the central portion of the inside space of the separator cover 2a.

An inlet pipe 2b and an outlet pipe 2c are formed integral with the separator cover 2a and laterally extend to be spacedly parallel with each other. The inlet pipe 2b is connected to the fuel tank of the vehicle so as to establish communication between the inside space of the separator cover 2a and the fuel tank, while the outlet pipe 2c is connected to an intake air passageway (not shown) through which intake air is supplied to the combustion chambers of the engine so as to establish communication between the inside space of the separator cover 2a and the intake air passageway.

Figure 4:
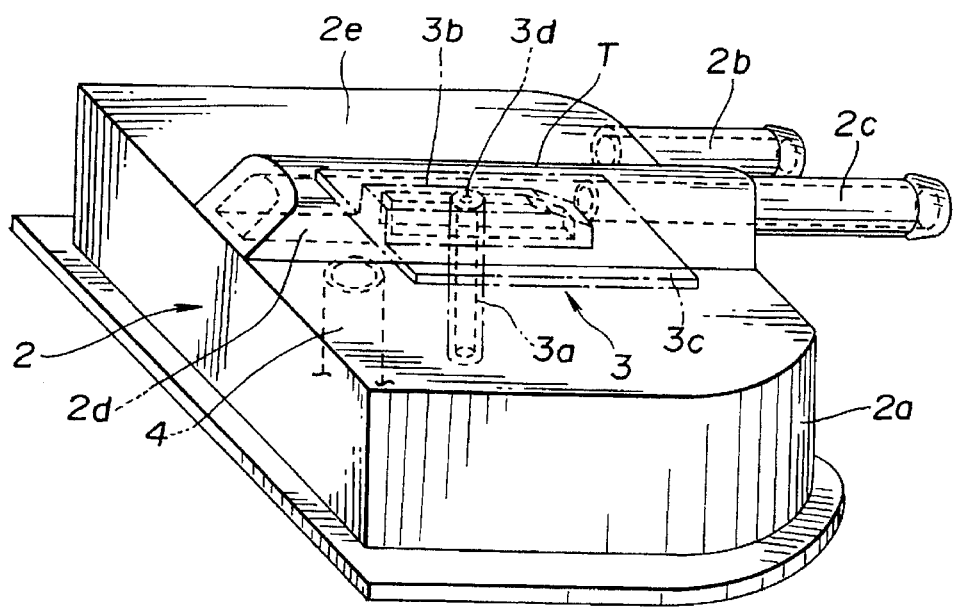
FIG. 4 is an enlarged perspective view of a liquid fuel separator of the fuel vapor treatment device of FIG. 1.

As clearly shown in FIG. 4, the outlet pipe 2c is integral with an upwardly projected tunnel-like portion T, which extends laterally straight. A groove-like passage or space 2d is formed inside the tunnel-like portion 2d and in communication with the inside opening of the outlet pipe 2c. The groove-like passage 2d is opened at its bottom to the inside space of separator cover 2a.

A liquid fuel sucking device 3 is disposed inside the separation cover 2a and includes a suction pipe 3a made of the same material as that of the casing main body section 1m. The suction pipe 3a extends vertically and parallel with the relay pipe 4. The suction pipe 3a has a lower end located generally at the level of the outer surface of the upper end wall 1a. The suction pipe 3a is provided at its upper end with a hollow key-like head portion 3b fitted in the groove-like passage 2d of the tunnel-like portion T and extends laterally to be parallel with the tunnel-like portion T. The key-like head portion 3b is formed with an orifice 3d, which communicates with the inside opening of the suction pipe 3a. The key-like head portion 3b is provided at its lower part with a laterally extending flat flange portion 3c. The flange portion 3c is welded to the lower surface of an upper wall 2e of the separation cover 2a and to the lower surface of the base portion of the outlet pipe 2c.

Figure 3:
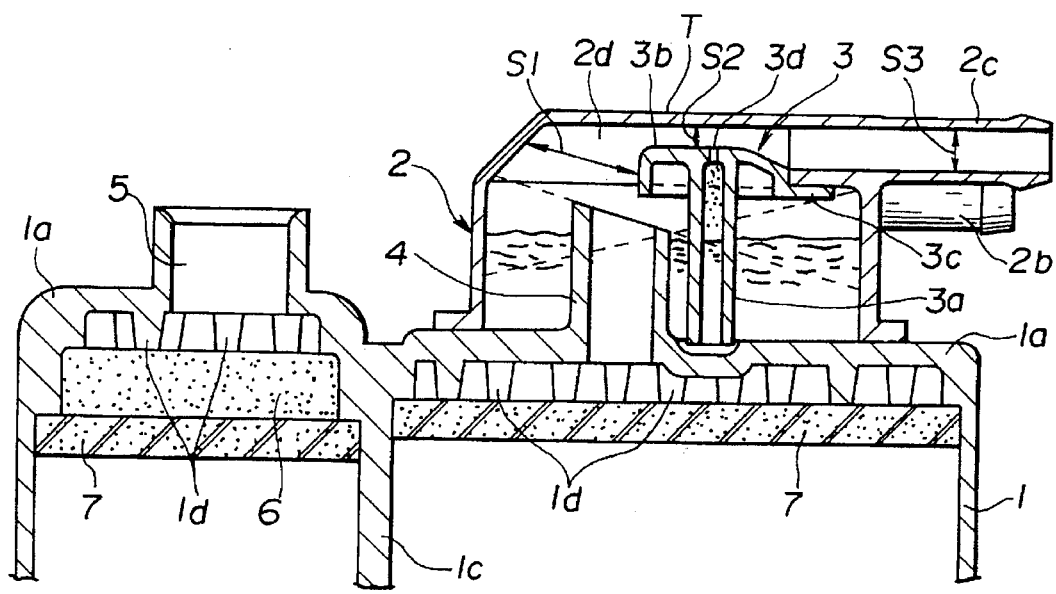
FIG. 3 is a fragmentary enlarged sectional view of the fuel vapor treatment device of FIG. 1.

As clearly shown in FIG. 3, the upper surface of the key-like head portion 3b is located near but separate from the upper surface of the tunnel-like portion T so that the groove-like passage 2d is narrowed partly with the key-like head portion 3b thereby defining a narrowed part or flow restricting area S2 having a cross-sectional area smaller than that of upstream and downstream parts S1, S3 located respectively on the upstream and downstream sides of the narrowed part S2. It will be understood that the upstream, narrowed and downstream parts S1, S2, S3 constitute a fuel vapor outflow passage through which the fuel vapor from the chambers A, B of the casing main body section 1m is sucked out toward the intake air passageway leading to the combustion chambers of the engine.

Thus, the relay pipe 4 is located adjacent the suction pipe 3a and has an upper end at a position set according to kinds of automotive vehicle and amounts of liquid fuel to be separated in the liquid fuel separator 2. In this instance, the upper end of the relay pipe 4 is arranged such that a plane containing the surface of the end edge thereof is inclined (preferably at an angle of from 17° to 20°) relative to a horizontal plane (not shown) perpendicular to the axis of the relay pipe 4 in a manner that a part (adjacent the central portion of the separator cover 2a) of the end edge of the relay pipe is lowered relative to another part (far from the central portion of the same) of the end edge of the same. Such arrangement of the upper end of the relay pipe 4 is employed taking account of the fact that the part adjacent to the central portion of the separator cover 2a has a small change in the level of the liquid fuel separated and collected in the separator cover 2a even if the liquid fuel level inclines as shown in FIG. 3 in the case where the vehicle is on an inclined road surface or is turning. It will be understood that the plane containing the surface of the end edge of the upper end of the relay pipe 4 may be horizontal or perpendicular to the axis of the suction pipe 3a.

In connection with the above, it is preferable for the suction pipe 3a to be also located around the central portion of the separator cover 2a in view of the fact that the central portion has a small change in the level of the liquid fuel and taking account of the fact that a fuel suction amount of the suction pipe 3a is affected by a change in head between the level of the liquid fuel and the lower end of the suction pipe 3a, owing to change of the liquid fuel level. In this instance, the lower end of the suction pipe 3a is positioned to reach the level of the upper surface of the upper end wall 1a of the casing 1, in which the upper surface of the upper end wall 1a is slightly depressed at a portion facing the lower end of the suction pipe 3a so as to form a predetermined clearance between the lower end of the suction pipe 3a and the surface of the upper end wall 1a of the casing 1. This prevents the suction pipe 3a from coming into contact with the upper surface of the upper end wall 1a during an installation operation for the separator cover 2a, while making it possible to suck out the liquid fuel as much as possible. It will be understood that the lower end of the suction pipe 3a may be positioned adjacent the upper surface of the upper end wall 1a of the casing 1, without forming a depression at the surface of the upper end wall 1a of the casing 1.

The manner of use and operation of the above canister C will be discussed hereinafter.

In use of the canister C, the canister C is installed in a state shown in FIG. 1 in which the axis of the casing 1 extends vertically. The inlet and outlet pipes 2b, 2c are connected to the fuel tank and the intake air passageway, respectively.

When the pressure of fuel vapor within the fuel tank exceeds a predetermined level during stoppage or cruising of the vehicle, the fuel vapor is introduced through a hose member (not shown) and the inlet pipe 2b into the separator cover 2a, in which high boiling point components of the fuel vapor are liquefied in the hose member and the inside space of the separator cover 2a. The thus liquefied high boiling point components (or liquid fuel) are separated and collected in the inside space of the separator cover 2a, so that a liquid fuel collecting space or sump for the separated liquid fuel is defined between the edge surface of the upper end of the relay pipe 4 and the upper surface of the upper end wall 1a of the casing 1.

The fuel vapor that has not been liquefied is introduced from the relay pipe 4 into the large chamber A, passing through the cushioning material 7. Then, the fuel vapor passes through the lower opening L and introduced into the small chamber B, in which the fuel vapor is absorbed in the fuel vapor absorbent M.

When the engine is operated, a vacuum is generated within the intake air passageway leading to the combustion chambers of the engine, the vacuum is introduced through the outlet pipe 2c into the chambers A, B of the casing main body section 1m, so that ambient air is sucked through the air intake pipe 5 into the small chamber B and then into the large chamber A. Then, under the action of the intake air, the fuel vapor absorbed in the fuel vapor absorbent M is purged and flows through the small chamber B and then through the large chamber A. The thus purged fuel vapor is passed through the relay pipe 4 and introduced into the inside space of the separator cover 2a. Then, the fuel vapor flows through the groove-like passage 2d and the inside opening of the outlet pipe 2c. In other words, the fuel vapor passes first through the upstream part S1, secondly through the narrowed part S2, and thirdly through the downstream part S3 of the fuel vapor outflow passage as indicated in FIG. 3.

During this flow of the fuel vapor, the flow speed of the purged fuel vapor becomes higher at the narrowed part S2 (defined above the head portion 3b) than that at the other parts S1, S3, so that a high vacuum is generated at the narrowed part S2. As a result, the liquid fuel accumulated (as indicated in FIG. 3) inside the separator cover 2a is sucked up through the inside opening of the suction pipe 3a and sprayed or atomized through the orifice 3d formed through the head portion 3b. The thus sprayed liquid fuel is mixed with the purged fuel vapor and carried smoothly and speedily to the intake air passageway.

Figure 5:
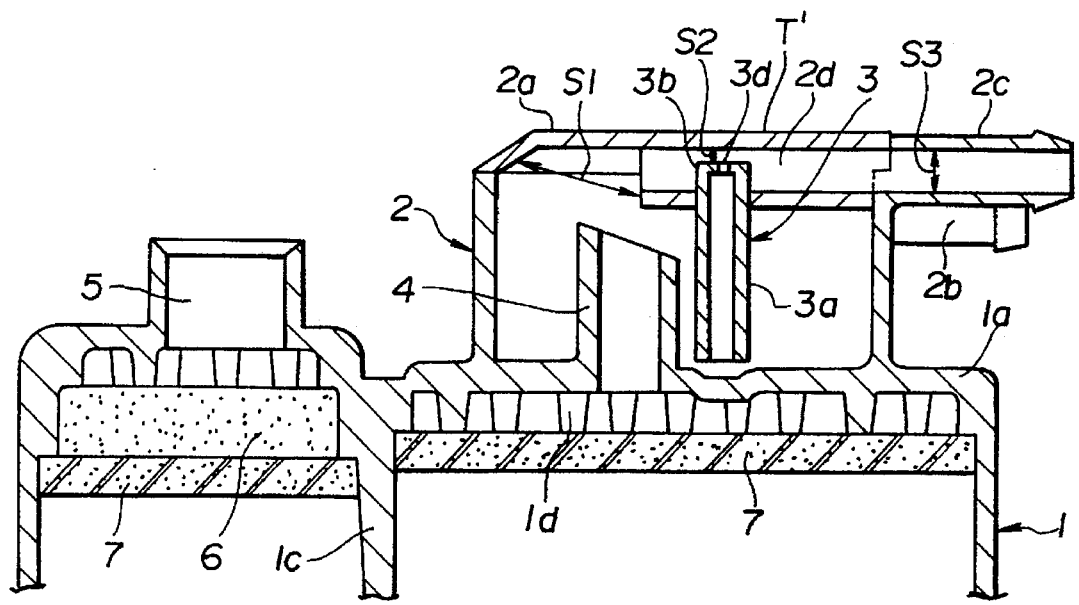
FIG. 5 is a fragmentary enlarged sectional view similar to FIG. 3 but showing a modified example of the fuel vapor treatment device of FIG. 1.
Figure 6:
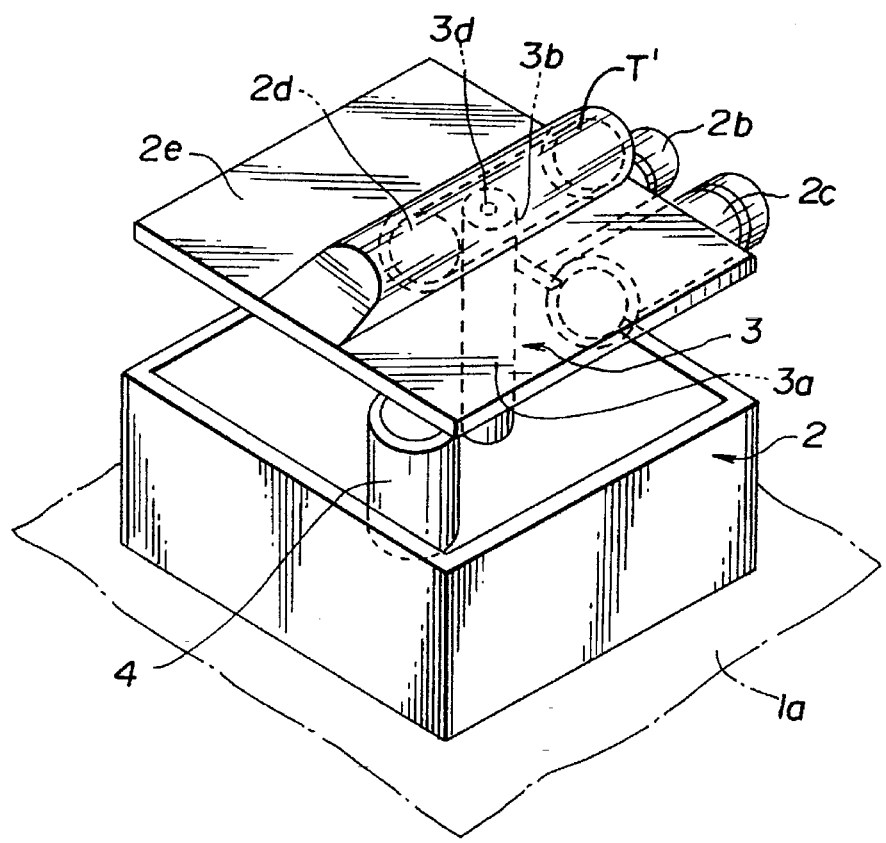
FIG. 6 is an enlarged perspective view of a liquid fuel separator of the fuel vapor treatment device of FIG. 5.

FIGS. 5 and 6 show a modified example of the canister C, which is similar to the canister of FIGS. 1 to 4. In this example, the liquid fuel separator 2 includes a pipe-shaped side wall section P1, which has a generally rectangular cross-section and extends upwardly from the upper end wall 1a of the casing 1. The side wall section P1 is integral at its lower end with the upper end wall 1a of the casing 1. The side wall section P1 is integrally provided with the inlet pipe 2b and the outlet pipe 2c. An upper separator section P2 is fixedly and sealingly mounted on the side wall section P1 and includes a cylindrical portion T' located in the upper wall 2e and having a free end sealingly connected to the outlet pipe 2c so as to be aligned with each other, thus forming the fuel vapor outflow passage through which the purged fuel vapor from the absorbent M is discharged toward the intake air passageway of the engine. The cylindrical portion T' defines therein a fuel vapor flow passage 2d' through which the fuel vapor passes. The cylindrical portion T' is provided with the suction pipe 3a in a manner that an upper end portion (no numeral) of the suction pipe 3a is sealingly inserted into the inside opening of the cylindrical portion T' so that their axes are generally perpendicular to each other. The head portion 3b is formed at the upper end of the suction pipe 3a in a manner to close the upper end. The suction pipe 3a extends vertically downwardly so that the lower end thereof is positioned generally at the level of the upper surface of the upper end wall 1a of the casing 1. The orifice 3d is formed through the head portion 3b. The head portion 3b is close to but separate from the inner upper wall surface of the cylindrical portion T' thereby forming the narrowed part S2. The upper separator section P2 is welded to the upper end of the side wall section P1.

With the arrangement of FIGS. 5 and 6, the purged fuel vapor introduced through the relay pipe 4 into the liquid fuel separator 2 passes through the narrowed part S2 of the fuel vapor outflow passage so that the flow speed of the fuel vapor becomes high at the narrowed part S2 thereby generating a high vacuum. As a result, the liquid fuel accumulated inside the side wall section P1 is sucked up and atomized through the orifice 3d. The thus atomized liquid fuel is mixed with stream of the purged fuel vapor from the fuel vapor absorbent M and carried to the intake air passageway of the engine.

Figure 7:
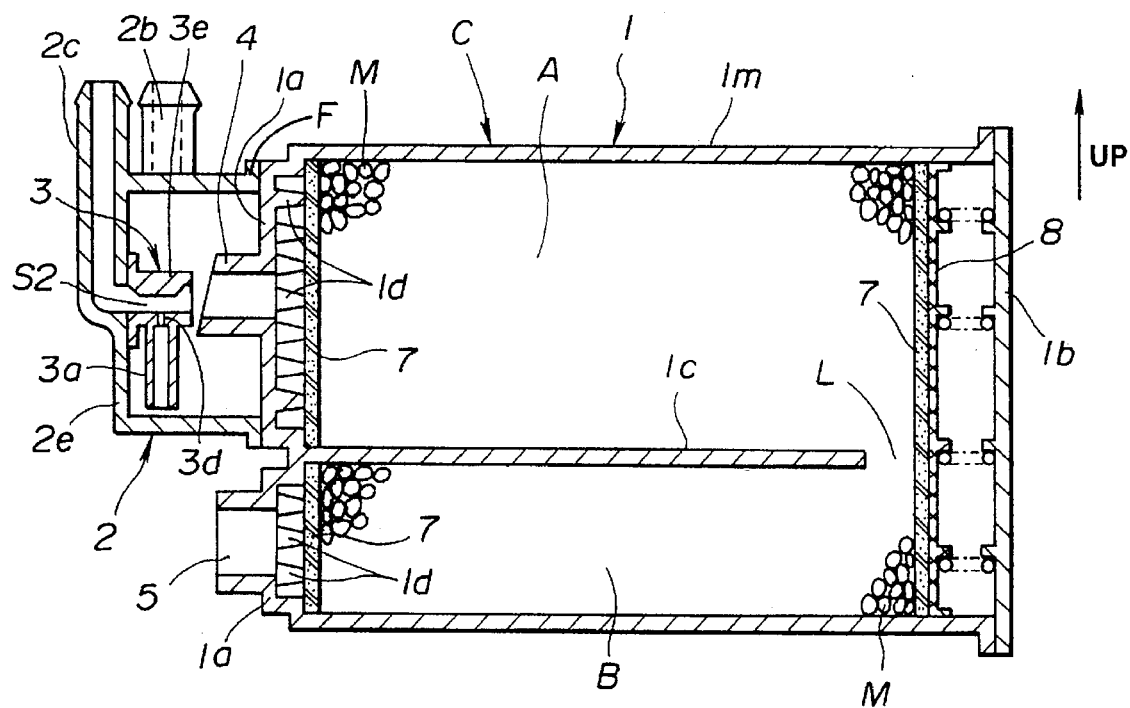
FIG. 7 is a vertical sectional view similar to FIG. 1 but showing another embodiment of the fuel vapor treatment device according to the present invention.
Figure 8:
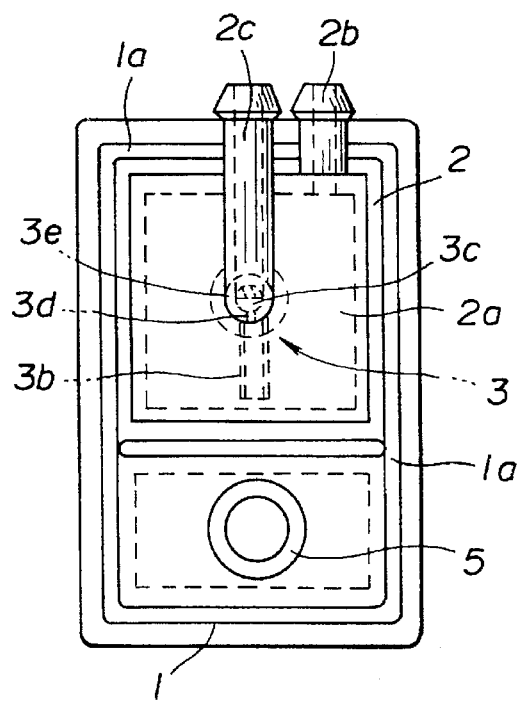
FIG. 8 is a side view of the fuel vapor treatment device of FIG. 7.
Figure 9:
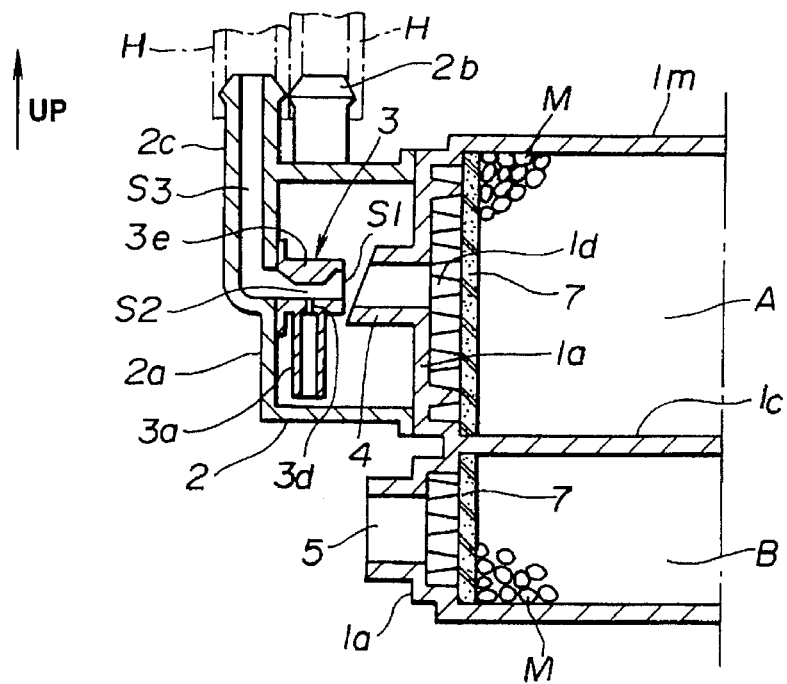
FIG. 9 is a fragmentary enlarged sectional view of the fuel vapor treatment device of FIG. 7.

FIGS. 7, 8 and 9 illustrate another embodiment of the canister C of the present invention, which is similar to that of FIGS. 1 to 4. In this embodiment, the canister C is adapted to be positioned horizontally so that the main body section 1m of the casing 1 extends generally horizontally. In this embodiment, the casing 1 is formed of a plastic or synthetic resin such as nylon or polypropylene. The main body section 1m of the casing 1 is generally cylindrical and has a generally oval cross-section. The one (left-side) end of the main body section 1m is closed with one side end wall 1a integral with and has the same in material as the main body section 1m. The partition wall 1c is integral with the side end wall 1a and extends laterally to generally divide the inside of the main body section 1m into the large chamber A and the small chamber B, which communicate with each other at their right-side portions. A lower portion of the side end wall 1a is provided at its inner surface with a plurality of the spacer projections 1d and is further provided with the air intake pipe 5 having the inside opening through which the inside of the main body section 1m communicates with ambient air. The plate-shaped cushioning material 7 is disposed aside the spacer projections 1d in a manner that they are in contact with each other. The cushioning material 7 is formed of non-woven fabric or polyurethane foam. The edge of the cushioning material 7 is in sealing contact with the inner wall surface of the casing main body section 1m and the wall surface of the partition wall 1c. An upper portion of the side end wall 1a is also provided at its inner surface with a plurality of the spacer projections 1d and further provided with the leftwardly extending relay pipe 4, which has the inside opening communicating with the large chamber A. The edge of the cushioning material 7 is in sealing contact with the inner wall surface of the casing main body section 1m and the wall surface of the partition wall 1c.

The fuel vapor absorbent M, such as activated carbon or charcoal, is filled in both the large and small chambers A, B. The plate-shaped cushioning material 7 and the supporting member 8 are disposed aside the fuel vapor absorbent M in a manner that they are in contact with each other. The cushioning material 7 is located separate from the right-side end of the partition wall 1c thereby defining the right-side opening L through which the large and small chambers A, B communicate with each other. The supporting member 8 is netting-like or lattice-like and made of a metal or a plastic. Springs (no numerals) are disposed between the supporting member 8 and another side end wall 1b, which is welded to the right-side end of the casing main body section 1m so as to push or bias the supporting member 8 leftwardly under a predetermined pressure. Accordingly, the fuel vapor absorbent M is tightly packed between the left-side cushioning materials 7, 7 adjacent the left-side end wall 1a and the right-side cushioning material 7 in contact with the support member 8.

The liquid fuel separator 2 is provided on the left-side end wall 1a of the casing 1. More specifically, the separator cover 2a of the liquid fuel separator 2 is made of the same material as that of the casing main body section 1m. The separator cover 2a is provided at its right-side portion with a laterally outwardly extending flange F which generally circularly extends to be endless thereby defining thereinside an opening (no numeral). The flange F of the separator cover 2a is welded to the outer surface of the end wall 1a of the casing 1 in a manner to maintain a gas tight seal between the separator cover 2a and the casing end wall 1a. The separator cover 2a has a predetermined lateral dimension and is formed with an inside space having a predetermined volume. Under this state, the relay pipe 4 is located around the central portion of the inside space of the separator cover 2a.

The inlet pipe 2b and the outlet pipe 2c are formed integral with the separator cover 2a and upwardly extend, spaced parallel with each other. The inlet pipe 2b is connected through a hose H to the fuel tank of the vehicle so as to establish communication between the inside space of the separator cover 2a and the fuel tank, while the outlet pipe 2c is connected through a hose H to the intake air passageway through which intake air is supplied to the combustion chambers of the engine so as to establish communication between the inside space of the separator cover 2a and the intake air passageway. The outlet pipe 2c is formed projecting from the side surface of the end wall 2e of the separator cover 2a, and extends vertically. The inside opening of the outlet pipe is bent at its lower end at right angles so as to be opened into the inside space of the separator cover 2a.

The liquid fuel sucking device 3 is disposed inside the separator cover 2a and includes the suction pipe 3a made of the same material as that of the casing main body section 1m. The suction pipe 3a extends vertically and perpendicularly to the extension of the relay pipe 4. The suction pipe 3a has a lower end located near the inner surface of the bottom wall of the separator cover 2a. The suction pipe 3a extends parallel with but in opposite directions to the inlet and outlet pipes 2b, 2c. In other words, the axis of the suction pipe 3a is perpendicular to a lateral plane containing the axis of the main body section 1m of the casing 1.

The suction pipe 3a is provided at its upper end with a generally cylindrical head portion 3e, which are integral with each other and made of the same material. The head portion 3e is formed at its left-side end with an annular flange (no numeral), which is welded or bonded to the inner surface of the side wall of the separator cover 2a in a manner that the inside opening thereof is coaxial and aligned with that of the lower end portion of the outlet pipe 2c. The axis of the inside opening of the head portion 3e is perpendicular to the axis of the suction pipe 3a. The cylindrical wall of the head portion 3e is formed with the orifice 3d through which the inside opening of the head portion 3e communicates with the inside opening of the suction pipe 3a.

As clearly shown in FIG. 9, the inside opening of the head portion 3e is narrowed partly at its part above the orifice 3d thereby defining the narrowed part or flow restricting area S2, which has a cross-sectional area smaller than that of upstream and downstream parts S1, S3 located respectively on the upstream and downstream sides of the narrowed part S2. It will be understood that the upstream, narrowed, and downstream parts S1, S2, S3 constitute the fuel vapor outflow passage through which the fuel vapor from the chambers A, B of the casing main body section 1m is sucked out toward the intake air passageway leading to the combustion chambers of the engine.

The relay pipe 4 is located such that its left-side free end is adjacent and slightly separate from the right-side free end of the head portion 3e of the liquid fuel sucking device 3. The relay pipe 4 is generally aligned and coaxial with the head portion 3e of the liquid fuel sucking device 3. The free end of the relay pipe 4 is arranged such that the plane containing the surface of the end edge thereof is inclined relative to a vertical plane (not shown) perpendicular to the axis of the relay pipe 4 in a manner that an upper part of the end edge of the suction pipe is short relative to a lower part of the end edge of the same. Such an arrangement of the upper end of the relay pipe 4 is employed in order that the fuel vapor from the inlet pipe 2b easily enters the chamber A in the casing main body section 1m, while making the accumulated liquid fuel difficult to enter the chamber A. It will be understood that the plane containing the surface of the end edge of the upper end of the relay pipe 4 may be vertical or perpendicular to the axis of the cylindrical head portion 3e of the liquid fuel sucking device 3.

The manner of use and operation of the above canister C of FIGS. 7 to 9 will be discussed hereinafter. In use of the canister C, the canister C is installed in a state shown in FIGS. 7 and 9 where the axis of the casing 1 extends horizontally or laterally. The inlet and outlet pipes 2b, 2c are connected through the hoses H to the fuel tank and the intake air passageway, respectively. When the pressure of fuel vapor within the fuel tank exceeds a predetermined level during stoppage or cruising of the vehicle, the fuel vapor is introduced through the hose H and the inlet pipe 2b into the separator cover 2a, in which high boiling point components of the fuel vapor are liquefied in the hose and the inside space of the separator cover 2a. The thus liquefied high boiling point components (or liquid fuel) are separated and collected in the inside space of the separator cover 2a, so that a liquid fuel collecting space or sump for the separated liquid fuel is formed at a lower part of the inside space of the separator cover 2a and located below the relay pipe 4.

The fuel vapor that has not been liquefied is introduced from the relay pipe 4 into the large chamber A, passing through the cushioning material 7. Then, the fuel vapor passes through the opening L and introduced into the small chamber B, in which the fuel vapor is absorbed in the fuel vapor absorbent M. When the engine is operated, a vacuum is generated within the intake air passageway leading to the combustion chambers of the engine. Then, the vacuum is introduced through the outlet pipe 2c into the chambers A, B of the casing main body section 1m, so that ambient air is sucked through the air intake pipe 5 into the small chamber B and then into the large chamber A. Under the action of the intake air, the fuel vapor absorbed in the fuel vapor absorbent M is purged and flows through the small chamber B and then through the large chamber A. The thus purged fuel vapor is passed through the relay pipe 4 and introduced into the inside space of the separator cover 2a. Then, the fuel vapor flows through the cylindrical head portion 3e of the liquid fuel sucking device 3 and the inside opening of the outlet pipe 2c. In other words, the fuel vapor passes first through the upstream part S1, secondly through the narrowed part S2, and thirdly through the downstream part S3 of the fuel vapor outflow passage as best shown in FIG. 9.

During this flow of the fuel vapor, the flow speed of the purged fuel vapor becomes higher at the narrowed part S2 (defined above the orifice 3d) than that at the other parts S1, S3, so that a high vacuum is generated at the narrowed part S2. As a result, the liquid fuel accumulated at the liquid fuel collecting space inside the separator cover 2a is sucked up through the inside opening of the suction pipe 3a and sprayed or atomized through the orifice 3d formed through the head portion 3b. The thus sprayed liquid fuel is mixed with the purged fuel vapor and carried smoothly and speedily to the intake air passageway.

Figure 10:
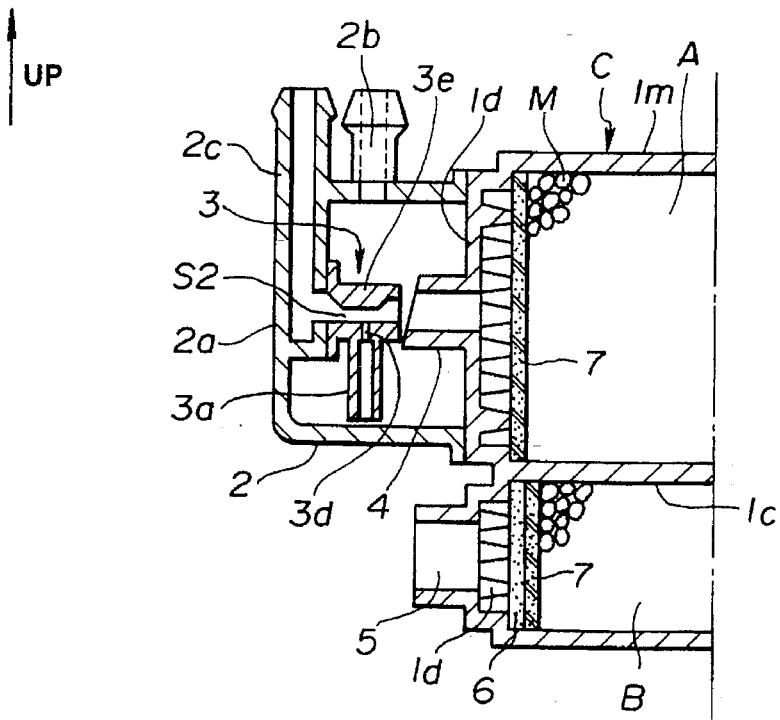
FIG. 10 is a fragmentary enlarged sectional view similar to FIG. 9 but showing a modified example of the fuel vapor treatment device of FIG. 7.

FIG. 10 shows a modified example of the canister C of the embodiment of FIGS. 7 and 10. In this example, the lateral dimension of the separator cover 2a of the liquid fuel separator 2 is enlarged so that the side wall 2e of the separator cover 2a is flush with the outlet pipe 2c inside the separator cover 2a. The outlet pipe 2c is formed at its lower wall with a through-hole (no numeral). The head portion 3e of the liquid fuel sucking device 3 is securely installed to the outlet pipe 2c in a manner that the through-hole of the outlet pipe 2c communicates with the inside opening of the head portion 3e. Additionally, the filter material 6 formed of paper, non-woven fabric or metal is disposed between the spacer projections 1d and the cushioning material 7, in the small chamber B.

Figure 11:
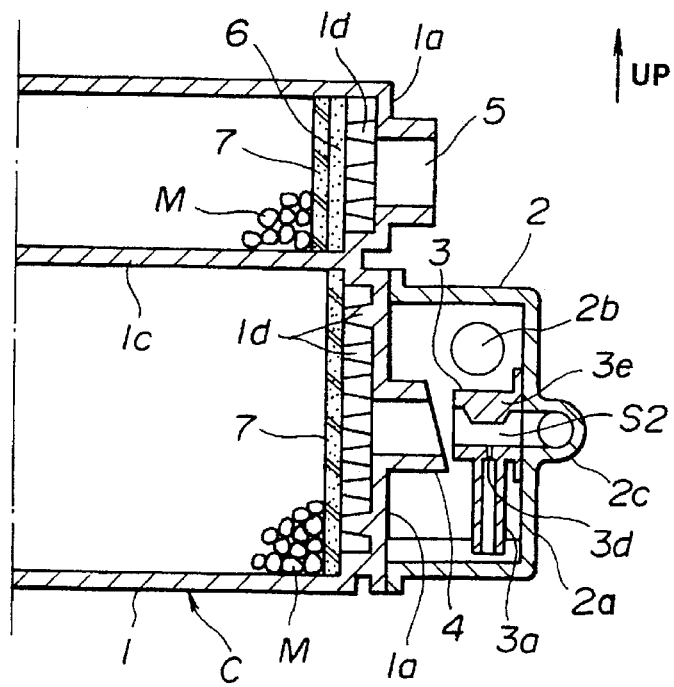
FIG. 11 is a fragmentary enlarged sectional view similar to FIG. 9. but showing another modified example of the fuel vapor treatment device of FIG. 7.
Figure 12:
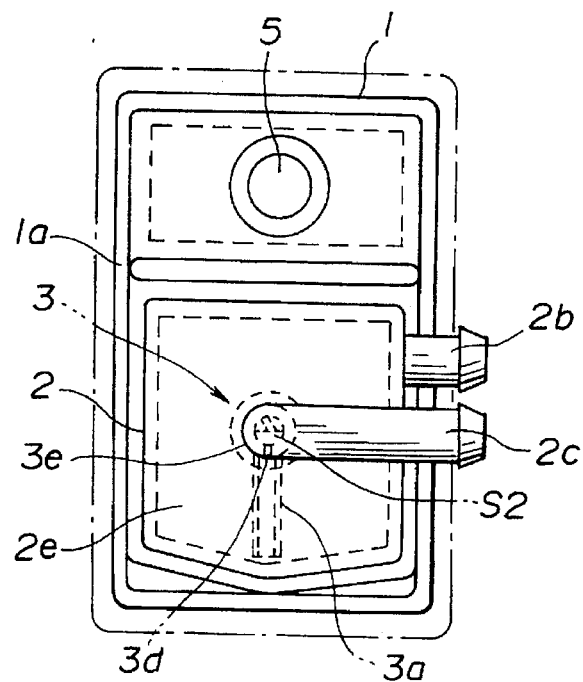
FIG. 12 is a side view of the fuel vapor treatment device of FIG. 11.
Figure 13:
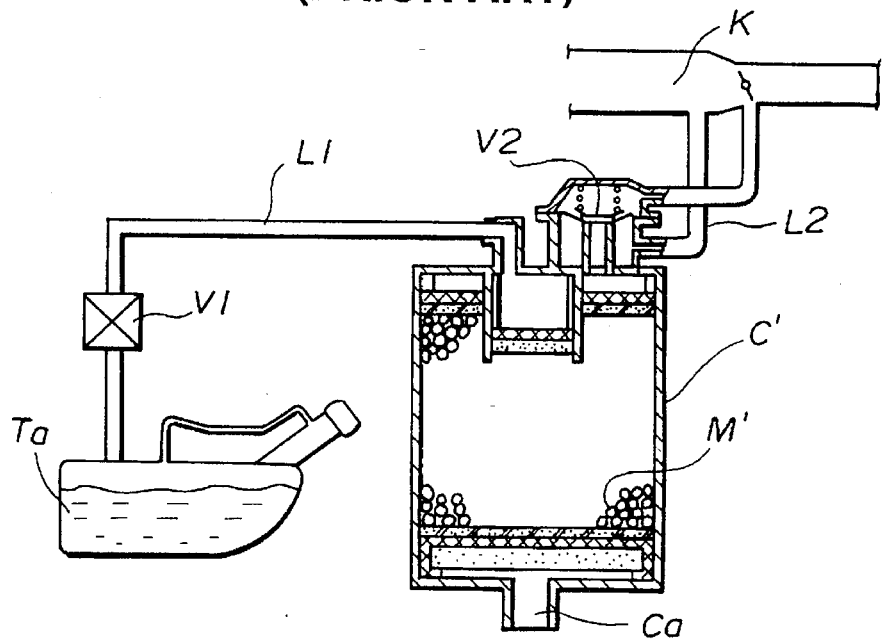
FIG. 13 is a schematic illustration of an evaporative emission control system including a conventional fuel vapor treatment device.
Figure 14:
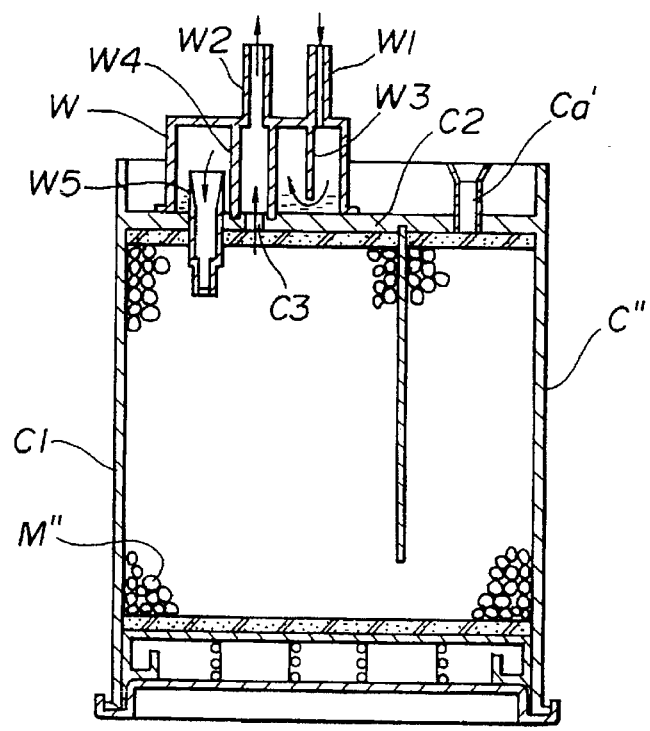
FIG. 14 is a vertical sectional view of another conventional fuel vapor treatment device.

FIGS. 11 and 12 show another modified example of and similar to the embodiment of FIGS. 7 and 9. In this example, the inlet and outlet pipes 2b, 2c are arranged such that their axes are perpendicular to a vertical plane containing the axis of the suction pipe 3a. Additionally, the lower wall of the separator cover 2a is formed to have a generally V-shaped cross-section as shown in FIG. 12, so that a deep portion is formed at the central part of the liquid fuel collecting space or sump. The suction pipe 3a vertically extends and has the lower end positioned adjacent the inner wall surface (defining the central portion of the sump) of the lower or bottom wall of the separator cover 2a. With this, the liquefied fuel in the liquid fuel separator 2 can be effectively collected at the central deep portion of the liquid fuel collecting sump and can be easily sucked out through the suction pipe 3a thereby minimizing the amount of the liquid fuel left in the liquid fuel separator 2.

In this example of FIGS. 11 and 12, the inlet pipe 2b is located near the center of the separator cover 2a relative to the outlet pipe 2c while extending in a direction downward of the surface of the drawing of FIG. 11. Additionally, the suction pipe 3a extends in a direction far from the inlet pipe 2b. However, various modifications may be applied to the example of FIGS. 11 and 12. For example, the inlet and outlet pipes 2b, 2c may extend in a direction upward of the surface of the drawing of FIG. 11, in which the suction pipe 3a extends in the opposite direction to that of FIG. 11. The inlet and outlet pipes 2b, 2c may extend upwardly or downwardly, in which the suction pipe 3a extends in a direction perpendicular to the surface of the drawing of FIG. 11. Further, the inlet and outlet pipes 2b, 2c may project from the outer surface of the side wall 2e of the separator cover 2a, in which the suction pipe 3a extends in a direction perpendicular to planes respectively containing the axes of the inlet and outlet pipes 2b, 2c. In such modified cases, the lower wall of the separator cover 2a is formed to have a generally V-shaped cross-section as shown in FIG. 12, in which the lower end of the suction pipe 3a is positioned at the deep portion of the liquid fuel collecting space or sump. It will be understood that the lower wall of the separator cover 2a may be flat. Additionally, in such modified cases, the free end of the relay pipe 4 may be arranged such that the plane containing the surface of the end edge thereof is inclined relative to the vertical plane (not shown) perpendicular to the axis of the relay pipe 4 in a manner that an upper part of the end edge of the suction pipe is short relative to a lower part of the end edge of the same.

In the above embodiments and examples, the liquid fuel sucking device 3 is arranged to be assembled to the casing 1 as a separate member or part, and therefore the size of the orifice 3d and/or the cross-sectional area of the narrowed part S2 of the cylindrical head portion 3e can be suitably and easily set thereby making it possible to control the amount of the liquefied fuel carried outside of the canister C in accordance with kinds of automotive vehicles.

While the casing 1 of the canister C has been shown and described as being provided with the partition wall 1c to divide the inside of the casing 1 into the two chambers A, B, and additionally as being formed with the air inlet pipe (opening) 5 located at the upper end wall in the above embodiments and examples, it will be understood that no partition wall 1c may be provided, and the air inlet opening may be formed at the lower end wall 1b of the casing in place of at the upper end wall.

Although the casing 1 has been shown and described as being formed into a vertically elongate shape and having a generally oval cross-section, and as being made of a plastic in the above embodiments and examples, it will be appreciated that the casing may have a circular cross-section, a rectangular cross-section, or other cross-sections, and that the casing may be made of other materials such as a light alloy.

While the passage 2d for the purged fuel vapor has been shown and described as being formed projecting over the level of the upper surface of the upper wall of the liquid fuel separator 2 in the above embodiments and examples, it will be understood that the passage 2d may be formed below the upper surface of the upper wall or inside the liquid fuel separator by increasing a height of the casing 1, and more specifically that of the liquid fuel separator. Additionally, it will be appreciated that the lower end of the suction pipe 3a is provided with a netting material to filter the liquid fuel to be introduced thereinto upon or without increasing the diameter of the lower end of the suction pipe.

What is claimed is:

1. A fuel vapor treatment device comprising:
    a casing including
        an end wall defining a chamber filled with a fuel vapor absorbent, and
        a relay pipe projected outwardly from said end wall, said relay pipe being in communication with said chamber; and a liquid fuel separator mounted on said casing and including
        a cover section sealingly fixed to said end wall of said casing and having an end wall defining thereinside an inside space in which said relay pipe of said casing projects,
        a fuel vapor inlet pipe connected to said cover section to be in communication with the inside space of said cover section, a fuel vapor outlet pipe connected to said cover section to be in communication with the inside space of said cover section, means defining a fuel vapor outflow passage adjacent said end wall of said cover section, said fuel vapor passage having a first end in communication with said inside space, and a second end in communication with said outlet pipe, a suction pipe disposed in said inside space of said cover section and having a first end positioned in a bottom part of said inside space of said cover section, and a second end located adjacent said fuel vapor outflow passage, said suction pipe having a head portion located at the second end thereof, said head portion being formed with an orifice through which said suction pipe is in communication with said fuel vapor outflow passage, and means defining a flow restricting area of said fuel vapor outflow passage over said head portion of said suction pipe, said flow restricting area being smaller in cross-sectional area than portions of said fuel vapor outflow passage upstream and downstream of said flow restricting area.

2. A fuel vapor treatment device as claimed in claim 1, wherein said fuel vapor outflow passage defining means includes means defining first, second and third parts constituting said fuel vapor outflow passage, said second part being located downstream of said first part and upstream of said third part relative to flow of fuel vapor, said second part being smaller in cross-sectional area than said first and second parts, said second part corresponding to said flow restricting area.

3. A fuel vapor treatment device as claimed in claim 2, wherein said casing is located such that its axis is generally horizontal.

4. A fuel vapor treatment device as claimed in claim 3, wherein said liquid fuel separator is mounted on a side end wall of said casing, said side end wall being located aside said fuel vapor absorbent.

5. A fuel vapor treatment device as claimed in claim 4, wherein said suction pipe extends generally vertically and has the first end positioned adjacent the inner surface of a wall of said cover section of said liquid fuel separator.

6. A fuel vapor treatment device as claimed in claim 5, wherein said head portion of said suction pipe is generally cylindrical and in communication with said outlet pipe, said head portion having an axis generally perpendicular to the axis of said suction pipe, wherein said orifice is formed through a cylindrical wall of said head portion so that said flow restricting area is formed inside said cylindrical head portion and above said orifice.

7. A fuel vapor treatment device as claimed in claim 6, wherein said relay pipe is generally coaxial and aligned with said cylindrical head portion of said suction pipe.

8. A fuel vapor treatment device as claimed in claim 7, wherein said relay pipe has a free end adjacent a free end of said cylindrical head portion, said free end of the relay pipe being arranged such that a plane containing a surface of an end edge of said free end is inclined relative to a vertical plane perpendicular to the axis of said casing in a manner that an upper part of the end edge of the suction pipe is short relative to a lower part of the end edge.

9. A fuel vapor treatment device as claimed in claim 8, wherein said inlet and outlet pipes extend generally perpendicularly to a plane containing the axis of said casing.

10. A fuel vapor treatment device as claimed in claim 2, wherein said cover section of said liquid fuel separator has a bottom wall adjacent where the first end of said suction pipe is positioned, said bottom wall having a generally V-shaped cross-section.

11. A fuel vapor treatment device as claimed in claim 1, wherein said casing is located such that its axis is generally vertical.

12. A fuel vapor treatment device as claimed in claim 11, wherein said liquid fuel separator is mounted on an upper end wall of said casing, said upper wall being located over said fuel vapor absorbent.

13. A fuel vapor treatment device as claimed in claim 12, wherein said suction pipe extends generally vertically and has the first end positioned adjacent the surface of said upper end wall of said casing.

14. A fuel vapor treatment device as claimed in claim 13, wherein said relay pipe of said casing is located adjacent said suction pipe and extends generally parallel with said suction pipe.

15. A fuel vapor treatment device as claimed in claim 14, wherein said relay pipe has a free end arranged such that a plane containing a surface of an end edge of said free end is inclined relative to a horizontal plane perpendicular to the axis of said casing in a manner that a first part of the end edge of the relay pipe is lowered relative to a second part of the end edge of said relay pipe, said first part being adjacent a central portion of said separator cover relative to said second part.

16. A fuel vapor treatment device as claimed in claim 11, wherein said inlet and outlet pipes extend generally perpendicularly to a plane containing the axis of said casing.

\* \* \* \* \*